(12) United States Patent
He et al.

(10) Patent No.: US 11,289,731 B2
(45) Date of Patent: Mar. 29, 2022

(54) FIRE-RESISTANT LITHIUM BATTERY CONTAINING AN ELECTRODE-PROTECTING LAYER

(71) Applicant: Nanotek Instruments, Inc., Dayton, OH (US)

(72) Inventors: Hui He, Dayton, OH (US); Yu-Sheng Su, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 176 days.

(21) Appl. No.: 15/991,577

(22) Filed: May 29, 2018

(65) Prior Publication Data
US 2019/0372148 A1 Dec. 5, 2019

(51) Int. Cl.
*H01M 10/052* (2010.01)
*H01M 10/0569* (2010.01)
*H01M 10/42* (2006.01)
*H01M 4/134* (2010.01)
*H01M 4/62* (2006.01)
*H01M 4/38* (2006.01)
*H01M 50/409* (2021.01)
*H01M 50/463* (2021.01)
*H01M 4/02* (2006.01)

(52) U.S. Cl.
CPC ......... *H01M 10/052* (2013.01); *H01M 4/134* (2013.01); *H01M 4/382* (2013.01); *H01M 4/623* (2013.01); *H01M 10/0569* (2013.01); *H01M 10/4235* (2013.01); *H01M 50/409* (2021.01); *H01M 50/463* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| 5,109,070 A | 4/1992 | Epstein et al. | |
| 2010/0316903 A1* | 12/2010 | Kim | H01M 2/1653 429/145 |
| 2011/0027658 A1* | 2/2011 | Kim | H01M 2/1646 429/247 |

(Continued)

*Primary Examiner* — Wyatt P McConnell (57) ABSTRACT

Provided is a lithium secondary battery containing an anode, a cathode, a porous separator/electrolyte element disposed between the anode and the cathode, and a cathode-protecting layer bonded or adhered to the cathode, wherein the cathode-protecting layer comprises a lithium ion-conducting polymer matrix or binder and inorganic material particles that are dispersed in or chemically bonded by the polymer matrix or binder and wherein the cathode-protecting layer has a thickness from 10 nm to 100 μm and the polymer matrix or binder has a lithium-ion conductivity from $10^{-8}$ S/cm to $5 \times 10^{-2}$ S/cm. Additionally or alternatively, there can be a similarly configured anode-protecting layer adhered to the anode. Such an electrode-protecting layer prevents massive internal shorting from occurring even when the porous separator gets melted, contracted, or collapsed under extreme temperature conditions induced by, for instance, dendrite or nail penetration.

20 Claims, 3 Drawing Sheets

(56) References Cited

U.S. PATENT DOCUMENTS

| | | | |
|---|---|---|---|
| 2012/0321953 A1 | 12/2012 | Chen et al. | |
| 2016/0126598 A1* | 5/2016 | Lee | H01M 2/1653 429/7 |
| 2017/0125673 A1* | 5/2017 | Hsu | H01L 45/1233 |

* cited by examiner

FIRE-RESISTANT LITHIUM BATTERY CONTAINING AN ELECTRODE-PROTECTING LAYER

FIELD OF THE INVENTION

The present invention provides a cathode-protecting layer and/or anode-protecting layer in a lithium-ion battery or a rechargeable lithium metal battery (having lithium metal as the anode active material) to prevent sudden massive internal shorting-induced battery fire or explosion.

BACKGROUND

Rechargeable lithium-ion (Li-ion) and rechargeable lithium metal batteries (e.g. lithium-sulfur, lithium-selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or lithium intercalation compound as an anode active material (except $Li_{4.4}Si$, which has a specific capacity of 4,200 mAh/g). Hence, in general, Li metal batteries (having a lithium metal anode) have a significantly higher energy density than lithium-ion batteries (e.g. having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult. In most of the lithium metal cells and lithium-ion cells, the electrolyte solvents are flammable. An urgent need exists for a simpler, more cost-effective, and easier to implement approach to preventing Li metal dendrite-induced internal short circuit and thermal runaway problems in Li metal batteries and other rechargeable lithium batteries.

These concerns over the safety of earlier lithium metal secondary batteries led to the development of lithium-ion batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost, safety, and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

Furthermore, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell has its own intrinsic safety issue. For instance, the transition metal elements in the lithium metal oxide cathode are highly active catalysts that can promote and accelerate the decomposition of organic solvents, causing thermal runaway or explosion initiation to occur at a relatively low electrolyte temperature (e.g. <200° C., as opposed to normally >400° C. without the catalytic effect).

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the ionic salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself as charges and discharges are repeated. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

With the rapid development of hybrid (HEV), plug-in hybrid electric vehicles (HEV), and all-battery electric vehicles (EV), there is an urgent need for anode and cathode materials and electrolytes that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^0$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l based on the combined Li and S weight or volume (not based on the total cell weight or volume), respectively, assuming complete reaction to $Li_2S$. With a proper cell design, a cell-level specific energy of 1,200 Wh/kg (of cell weight) and cell-level energy density of 1,400 Wh/l (of cell volume) should be achievable. However, the current Li-sulfur experimental cells of industry leaders in sulfur cathode technology have a maximum cell specific energy of 250-400 Wh/kg (based on the total cell weight), far less than what could be obtained in real practice.

In summary, despite its considerable advantages, the rechargeable lithium metal cell in general and the Li—S cell and the Li-Air cell in particular are plagued with several major technical problems that have hindered its widespread commercialization:

(1) Conventional lithium metal secondary cells (e.g., rechargeable Li metal cells, Li—S cells, and Li-Air cells) still have dendrite formation and related internal shorting and thermal runaway issues. Also, conventional Li-ion cells still make use of significant amounts of flammable liquids (e.g. propylene carbonate, ethylene carbonate, 1,3-dioxolane, etc.) as the primary electrolyte solvent, risking danger of explosion;

(2) The Li—S cell tends to exhibit significant capacity degradation during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator and electrolyte to the Li negative electrode whereupon they are reduced to solid precipitates ($Li_2S_2$ and/or $Li_2S$), causing active mass loss. In addition, the solid product that precipitates on the surface of the positive electrode during discharge can become electrochemically irreversible, which also contributes to active mass loss.

(3) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads resulting in loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density rechargeable cells containing elemental sulfur, organo-sulfur and carbon-sulfur cathode materials, or derivatives and combinations thereof, there remains a need for materials and cell designs that (a) retard or reduce the out-diffusion of anionic reduction products, from the cathode compartments into other components in these cells, (b) improve the battery safety, and (c) provide rechargeable cells with high capacities over a large number of cycles.

Although solid electrolytes are effective in addressing the lithium metal dendrite and flammability issues, conventional solid-state electrolytes have the following major deficiencies: low lithium ion conductivities (typically $<<10^{-4}$ S/cm, more typically $<<10^{-5}$ S/cm, and further more typically $<<10^{-6}$ S/cm), difficulty in making solid-state electrolyte (high temperature sintering typically required) and implementing it in a battery cell, extreme brittleness, no flexibility (hence, not being compliant and being in poor ionic contact with the anode and/or cathode and, hence, poor active material utilization efficiency), and high costs.

A porous separator (e.g. polyolefin-based, non-woven of electrically insulating fibers, etc.) is used in lithium secondary batteries for the purpose of preventing short circuiting between an anode and a cathode and provides pores serving as a passage for lithium ions. Most of the commercially available lithium batteries make use of a polyolefin (e.g. polyethylene, polypropylene, PE/PP copolymer, etc.) as a separator. However, under a high temperature environment (e.g. >100° C.) such a separator layer shrinks/contracts and at a still higher temperature (e.g. >130° C. for PE or >165° C. for PP), the separator gets melted and contracted, thereby losing its ability to electrically separate the anode and the cathode. Such a high temperature condition can be caused by internal shorting (e.g. a lithium dendrite or nail penetrating the separator). Once the separator gets contracted, massive anode-cathode contacts (massive internal shorting) occur, leading to rapid thermal runaway. If a flammable electrolyte is used in such a battery, this thermal runaway causes fire and explosion.

In order to suppress the thermal contraction of the separator, inorganic particles together with a binder are coated on one or both surfaces of the porous separator substrate of the porous separator. Such an inorganic particle-separator combination is presumably more stable due to the inorganic particles being capable of increasing the thermal stability of a polymer. However, such a coating layer of inorganic particles adhered to a porous polymer separator is not capable of stopping the contraction or collapse of the separator and, as such, massive internal shorting still occurs.

Hence, a general object of the present invention is to provide a cathode-protecting layer and/or an anode-protecting layer, preferably in conjunction with a non-flammable electrolyte system, for a rechargeable lithium cell that exhibits a long cycle life and no danger of explosion. This arrangement overcomes the aforementioned deficiencies.

The invention also provides a rechargeable lithium cell containing such a safe configuration. This lithium cell includes the lithium metal secondary cell (e.g. Li—S, Li—TiS$_2$, Li—Se, Li—MoS$_2$, Li—VO$_2$, and Li-air, just to name a few), lithium-ion cell (e.g. graphite-LiMn$_2$O$_4$, Si—Li$_x$Ni$_y$Mn$_z$O$_2$, etc.), Li-ion sulfur cell (e.g. prelithiated Si—S cell), and hybrid lithium cell (wherein at least one electrode operates on lithium insertion or intercalation).

A specific object of the present invention is to provide a rechargeable Li—S battery that exhibits an exceptionally high specific energy or high energy density and a high level of safety.

A very important object of the present invention is to provide a simple, cost-effective, and easy-to-implement approach to preventing potential Li metal dendrite-induced internal short circuit and thermal runaway problems in various Li metal and Li-ion batteries.

SUMMARY OF THE INVENTION

The present invention provides a lithium secondary battery containing an anode, a cathode, a porous separator/electrolyte element disposed between the anode and the cathode, and a cathode-protecting layer bonded or adhered to the cathode and disposed between the porous separator and the cathode, wherein the cathode-protecting layer comprises a lithium ion-conducting polymer matrix or binder and inorganic material particles that are dispersed in or chemically bonded by the polymer matrix or binder and wherein the cathode-protecting layer has a thickness from 10 nm to 100 µm and the polymer matrix or binder has a lithium-ion conductivity from $10^{-8}$ S/cm to $5 \times 10^{-2}$ S/cm.

Such a protective layer prevents massive internal shorting from occurring even when the porous separator gets melted, contracted, or collapsed under extreme temperature conditions induced by, for instance, dendrite or nail penetration. When/if massive internal shorting occurs, a non-flammable electrolyte alone may not be capable of stopping the initiation and propagation of a fire since other components (e.g. separator, anode, and/or cathode) may still catch a fire, leading to battery fire and explosion. The present invention was aimed at preventing massive internal shorting due to melt-down and collapse of the porous separator and resulting massive intimate contact between the anode and the cathode along substantially the entire interface between the two electrodes.

Alternatively or additionally, the battery may comprise an anode-protecting layer adhered or bonded to the anode and disposed between the anode and the porous separator, wherein the anode-protecting layer comprises a second lithium ion-conducting polymer matrix or binder and second inorganic material particles that are dispersed in or chemically bonded by the second polymer matrix or binder and wherein the anode-protecting layer has a thickness from 10 nm to 100 µm and the second polymer matrix or binder has a lithium-ion conductivity from $10^{-8}$ S/cm to $5 \times 10^{-2}$ S/cm. The second lithium ion-conducting polymer matrix or binder may be the same or different than the first lithium ion-conducting polymer matrix or binder and the second inorganic material may be the same or different than the first inorganic material.

The anode-protecting layer and/or the cathode-protecting layer is preferably used in conjunction with a non-flammable electrolyte.

The lithium secondary battery can be a lithium-ion battery or a rechargeable lithium metal battery, such as an all-solid state lithium battery, a lithium-sulfur battery, a lithium-selenium battery, or a lithium-air battery.

The cathode-protecting layer or anode-protecting layer serves as a heat-resistant spacer layer that survives and stays as a spacer to keep the anode and the cathode apart, preventing massive internal shorting from occurring, when the porous separator gets melted, contracted, or collapsed under extreme temperature conditions induced by, for instance, dendrite or nail penetration. There are other types of heat-resistant spacer layers that can be implemented to impart fire resistance to a lithium battery (e.g. woven fabric, non-woven structure, foam, paper, and porous membrane comprising particles of a thermally stable inorganic material in the form of fibers, wires, nanotubes, nanowires, nanoplatelets, nanoribbons, and nanosheets, etc. Thermal stability implies a melting point or a heat-induced degradation temperature higher than 400° C. (preferably from 500° C. to 3,500° C.). These particles are properly distributed in such a manner that they keep the anode and the cathode apart even when the commonly implemented porous separator fails.

Thus, the invention also provides a method of improving fire resistance of a lithium secondary battery. In certain embodiments, the method comprises disposing a first heat-resistant spacer layer between the porous separator and the cathode layer, wherein the first heat-resistant spacer layer is bonded or adhered to the cathode and wherein the first heat-resistant spacer layer comprises at least one of (a) a first lithium ion-conducting polymer matrix or binder and particles of a first inorganic material that are dispersed in or chemically bonded by the first polymer matrix or binder and wherein the first heat-resistant spacer layer has a thickness from 10 nm to 100 µm and the first polymer matrix or binder has a lithium-ion conductivity from $10^{-8}$ S/cm to $5 \times 10^{-2}$ S/cm and (b) a fabric, paper, non-woven structure, foam, or porous membrane of a first inorganic material; wherein the first inorganic material has a melting point or thermal degradation temperature higher than 400° C. (preferably higher than 600° C., further preferably higher than 1,000° C., and can be up to 3,500° C.).

In certain embodiments, the method further comprises disposing a second heat-resistant spacer layer between the porous separator and the anode layer, wherein the second heat-resistant spacer layer is bonded or adhered to the anode and wherein the second heat-resistant spacer layer comprises (a) a second lithium ion-conducting polymer matrix or binder and particles of a second inorganic material that are dispersed in or chemically bonded by the second polymer matrix or binder and wherein the second heat-resistant spacer layer has a thickness from 10 nm to 100 µm and the second polymer matrix or binder has a lithium-ion conductivity from $10^{-8}$ S/cm to $5 \times 10^{-2}$ S/cm or (b) a fabric, paper, non-woven structure, foam, or porous membrane of a second inorganic material; wherein the second inorganic material has a melting point or thermal degradation temperature higher than 400° C., up to 3,500° C.

In certain embodiments, the invention provides a method of improving fire resistance of a lithium secondary battery. The method comprises disposing a second heat-resistant spacer layer between the porous separator and the anode layer, wherein the second heat-resistant spacer layer is bonded or adhered to the anode and wherein the second heat-resistant spacer layer comprises (a) a second lithium ion-conducting polymer matrix or binder and particles of a second inorganic material that are dispersed in or chemically bonded by the second polymer matrix or binder and wherein the second heat-resistant spacer layer has a thickness from 10 nm to 100 μm and the second polymer matrix or binder has a lithium-ion conductivity from $10^{-8}$ S/cm to $5\times10^{-2}$ S/cm or (b) a fabric, paper, non-woven structure, foam, or porous membrane of a second inorganic material; wherein the second inorganic material has a melting point or thermal degradation temperature higher than 400° C.

In certain embodiments, the first or second polymer matrix or binder comprises a sulfonated polymer, a mixture of a sulfonated polymer and an electron-conducting polymer (intended primarily for use in the cathode side where the cathode active materials are typically low in electronic conductivity), a mixture of a sulfonated polymer and an electronically non-conducting polymer, or a mixture of an electron-conducting polymer and a lithium ion-conducting polymer. In an embodiment, the polymer matrix or binder contains sulfonated polyaniline, sulfonated polypyrrole, sulfonated polythiophene, sulfonated polyfuran, or a combination thereof.

The sulfonated polymer may be selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidene fluoride, sulfonated copolymers of polyvinylidene fluoride with hexafluoropropene and tetrafluoroethylene, sulfonated copolymers of ethylene and tetrafluoroethylene, polybenzimidazole, and chemical derivatives, copolymers, and blends thereof.

In certain embodiments, the first or second polymer matrix or binder comprises a lithium ion-conducting polymer selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

In certain embodiments, the first or second polymer matrix or binder contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, and poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, or a combination thereof.

In certain embodiments, the first or second polymer matrix or binder material is in an amount from 1% to 80% by volume of the cathode-protecting layer or anode-protecting layer (preferably from 1% to 50% and more preferably from 5% to 20%).

The first or second polymer matrix or binder may preferably have a room temperature lithium ion conductivity no less than $10^{-4}$ S/cm, more preferably no less than $10^{-3}$ S/cm (can be as high as $5\times10^{-2}$ S/cm).

In certain embodiments, the first or second inorganic material particles are selected from a metal oxide, metal carbide, metal nitride, metal boride, metal dichalcogenide, phosphate, sulfate, titanate, silicate, aluminosilicate, or a combination thereof.

In certain embodiments, the first or second inorganic material particles are selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, aluminum, or a combination thereof.

In certain embodiments, the first or second inorganic material particles are selected from nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm.

In certain embodiments, the first or second inorganic material particles are selected from the group consisting of oxides, phosphates, sulfates, titanates, silicates, and aluminosilicates of at least one of the elements zirconium, aluminum, silicon, lithium, calcium, magnesium, potassium, or sodium.

In certain preferred embodiments, the cathode-protecting layer is bonded or adhered to the cathode having a first adhesion strength and the cathode-protecting layer is adhered to the separator having a second adhesion strength which is smaller than the first adhesion strength.

In certain preferred embodiments, the anode-protecting layer is bonded or adhered to the anode having a first adhesion strength and the anode-protecting layer is adhered to the separator having a second adhesion strength which is smaller than the first adhesion strength.

The electrolyte used in the instant lithium battery may be selected from a non-aqueous liquid electrolyte, polymer gel electrolyte, polymer electrolyte, quasi-solid electrolyte, solid-state inorganic electrolyte, ionic liquid electrolyte, or a combination thereof.

In certain embodiments, the electrolyte comprises a lithium ion-conducting inorganic species or lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium, $LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bis-perfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The electrolyte may comprise a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

The electrolyte is preferably a non-flammable electrolyte e.g. an electrolyte having a flash point higher than 150° C., preferably higher than 200° C., and most preferably no detectable flash point (flash point being too high to be detectable or the amount of organic vapor being too little to detect at a temperature as high as 200° C.).

The non-flammable electrolyte can be a room temperature ionic liquid. Alternatively, the non-flammable electrolyte contains a solid polymer electrolyte or an inorganic solid electrolyte.

In certain embodiments, a non-flammable quasi-solid electrolyte contains a lithium salt dissolved in a liquid solvent having a lithium salt concentration from 3.5 M to 14.0 M (more typically from 3.5 M to 10 M and further more typically from 5.0 M to 7.5 M) so that the electrolyte exhibits a vapor pressure less than 0.01 kPa when measured at 20° C., a vapor pressure less than 60% of the vapor pressure of the liquid solvent alone, a flash point at least 20 degrees Celsius higher than a flash point of the liquid solvent alone, a flash point higher than 150° C., or no flash point.

In certain embodiments, a non-flammable quasi-solid electrolyte contains a lithium salt dissolved in a mixture of a liquid solvent and a liquid additive having a lithium salt concentration from 1.5 M to 5.0 M so that the electrolyte exhibits a vapor pressure less than 0.01 kPa when measured at 20° C., a vapor pressure less than 60% of the vapor pressure of the liquid solvent alone, a flash point at least 20 degrees Celsius higher than a flash point of the liquid solvent alone, a flash point higher than 150° C., or no flash point. The liquid additive, different in composition than the liquid solvent, is selected from Hydrofluoro ether (HFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkyylsilane (Si—C), liquid oligomeric silaxane (—Si—O—Si—), Ttetraethylene glycol dimethylether (TEGDME), canola oil, or a combination thereof. The liquid additive-to-liquid solvent ratio in the mixture is from 5/95 to 95/5 by weight, preferably from 15/85 to 85/15 by weight, further preferably from 25/75 to 75/25 by weight, and most preferably from 35/65 to 65/35 by weight.

The cathode-protecting layer or the anode-protecting layer may further contain particles of a filler dispersed therein. The filler may be selected from a metal oxide, metal carbide, metal nitride, metal boride, metal dichalcogenide, or a combination thereof. Preferably, the filler is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form.

The filler may be selected from nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The filler, if present, contains defects to promote migration of lithium ions during normal operations of the lithium battery. Preferably the filler is from 1% to 30% by volume.

The advantages and features of the present invention will become more transparent with the description of the following best mode practice and illustrative examples.

DETAILED DESCRIPTION OF PREFERRED EMBODIMENTS

The present invention provides a safe and high-performing rechargeable lithium battery, which can be any of the various types of lithium-ion cells or lithium metal cells (e.g. Li-metal oxide, Li—S, Li-air, and Li—Se cells, etc.). A high degree of safety is imparted to this battery by a novel and unique cathode-protecting layer that is capable of preventing massive internal shorting (due to melt-down, collapse, or contraction of the porous polymer separator in the event of a short-circuiting). This cathode-protecting layer is preferably implemented in the lithium cell in conjunction with an essentially non-flammable electrolyte (e.g. an electrolyte having a flash point higher than 150° C., preferably higher than 200° C., and most preferably no flash point or flash point being non-detectable) and would not initiate a fire and, hence, would not pose explosion danger. This invention has solved the very most critical issue that has plagued the lithium-metal and lithium-ion industries for more than two decades.

For illustration purpose, the following discussion of preferred embodiments is primarily based on Li-ion cells and Li—S cells (as an example), but the same or similar principles and procedures are applicable to all other rechargeable lithium metal batteries (using lithium metal or metal alloy as the anode active material). The cathode active materials can be, for instance, a transition metal oxide (e.g. V$_2$O$_5$) or sulfide (e.g. MoS$_2$), sulfur or polysulfide (e.g. lithium polysulfide), selenium, metal selenide, or just outside air (for a lithium-air).

Figure 1:
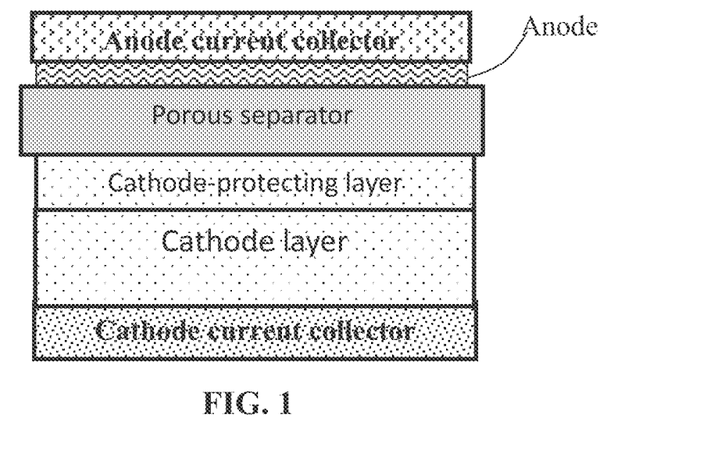
FIG. 1 Schematic of a protected rechargeable lithium metal battery or lithium-ion battery.

The present invention provides a lithium secondary battery, as schematically illustrated in FIG. 1, containing an anode, a cathode, a porous separator disposed between the anode and the cathode, an electrolyte, and a cathode-protecting layer bonded or adhered to the cathode and disposed between the porous separator and the cathode, wherein the cathode-protecting layer comprises a lithium ion-conducting polymer matrix or binder and inorganic material particles that are dispersed in or chemically bonded by the polymer matrix or binder and wherein the cathode-protecting layer has a thickness preferably from 10 nm to 200 µm (preferably from 100 nm to 100 µm) and the polymer matrix or binder has a lithium-ion conductivity from $10^{-8}$ S/cm to $5\times10^{-2}$ S/cm (preferably and more typically from $10^{-4}$ S/cm to $5\times10^{-2}$ S/cm). Preferably, such inorganic material particles have a heat-induced degradation temperature or melting point higher than 400° C. (up to 3,500° C.). Such a protective layer prevents massive internal shorting from occurring even when the porous separator gets melted, contracted, or collapsed under extreme temperature conditions induced by, for instance, dendrite or nail penetration.

This cathode-protecting layer covers essentially the entire primary surface (the surface facing the porous separator) of a cathode layer while the opposing primary surface of the cathode layer is typically bonded to a current collector, such as an Al foil. Preferably, this cathode-protecting layer is strongly adhered or bonded to this primary surface of the cathode. This cathode-protecting layer may be in physical contact with the porous separator, but preferably does not form a strong adhesion to the porous separator layer. This adhesion strength between the porous separator and the cathode-protecting layer is preferably weaker than the adhesion strength between the cathode-protecting layer and the cathode. In the event of an internal shorting (caused by lithium dendrite or a nail or sharp object penetrating through the porous separator layer, for instance), the internal temperature of the battery can be raised uncontrollably to exceed the melting point of the porous separator, causing the separator to get melted, contracted, or collapsed. Such a separator failure in a conventional lithium battery would allow the anode to be in close and intimate contact with the cathode, a situation of massive internal shorting. This would lead to thermal runaway and even explosion of the lithium battery.

We have conducted extensive needle penetration tests on a broad array of lithium batteries. Not wishing to be bound by theory, we have surprisingly observed that implementation of the presently invented cathode-protecting layer appears to be capable of preventing the occurrence of such a battery failure by preventing close, massive contact between the anode and the cathode and, thus, avoiding massive internal shorting. By intentionally making the adhesion between the cathode and cathode-protecting layer stronger than the adhesion between the cathode-protecting layer and the porous separator, we can prevent the cathode-protecting layer from being pulled to collapse along with the contraction or collapsing of the porous separator. The particles of an inorganic material, along with an optional filler, remain capable of spacing apart the anode active material and the cathode active material even when the porous separator fails.

The battery may comprise an anode-protecting layer adhered or bonded to the anode and disposed between the anode and the porous separator, with or without the presence of a cathode-protecting layer. The anode-protecting layer comprises a second lithium ion-conducting polymer matrix or binder and second inorganic material particles that are dispersed in or chemically bonded by the second polymer matrix or binder and wherein the anode-protecting layer has a thickness from 10 nm to 100 µm and the second polymer matrix or binder has a lithium-ion conductivity from $10^{-8}$ S/cm to $5\times10^{-2}$ (or 0.05) S/cm. The second lithium ion-conducting polymer matrix or binder may be the same or different than the first lithium ion-conducting polymer matrix or binder and the second inorganic material may be the same or different than the first inorganic material. Such an anode-protecting layer also appears to be effective in preventing massive internal shorting. Preferably, the adhesion between the anode-protecting layer and the anode is stronger than the adhesion between the anode-protecting layer and the porous separator.

The present invention also provides a method of improving fire resistance of a lithium secondary battery comprising an anode, a cathode, a porous separator disposed between the anode and the cathode, and an electrolyte. The method comprises disposing a heat-resistant spacer layer between the porous separator and the cathode layer and/or the anode layer, wherein the heat-resistant spacer layer contains a distribution of particles of a thermally stable material having a heat-induced degradation temperature or melting point higher than 400° C. and wherein the heat-resistant spacer layer acts to space apart the anode and the cathode when the porous separator fails.

The heat-resistant spacer layer may include a woven fabric, non-woven structure, foam, paper, and porous membrane comprising particles of a thermally stable material in the form of fibers, wires, nanotubes, nanowires, nanoplatelets, nanoribbons, nanosheets, and the like, or a combination thereof. Such a thermally stable polymer has a melting point or a heat-induced degradation temperature higher than 400° C. (preferably from 500 to 3,500° C.). These particles are properly distributed in such a manner that they keep the anode and the cathode apart even when the commonly implemented porous separator fails. Examples of such a thermally stable material includes an inorganic material selected from a metal oxide, metal carbide, metal nitride, metal boride, metal dichalcogenide, phosphate, sulfate, titanate, silicate, aluminosilicate, or a combination thereof. Certain thermally stable organic polymers (e.g. ladder polymers and certain polyimide materials) can exhibit a thermal degradation temperature higher than 400° C. These organic polymers or inorganic materials are preferably in a form of fibers, nanofibers, nanotubes, nanosheets, nanoplatelets, or nanoribbons that are formed into a woven fabric, non-woven structure, porous paper, or porous membrane sheet.

Alternatively, the heat-resistant spacer layer may comprise a lithium ion-conducting polymer matrix or binder and inorganic material particles that are dispersed in or chemically bonded by the polymer matrix or binder wherein the spacer layer or electrode-protecting layer has a thickness from 10 nm to 100 µm and the polymer matrix or binder has a lithium-ion conductivity from $10^{-8}$ S/cm to $5\times10^{-2}$ (or 0.05) S/cm.

The anode-protecting layer or the cathode-protecting layer has to be reasonably lithium ion-conducting since they still have to allow for lithium ion permeation during the normal operation of the lithium battery.

We have surprisingly observed that a wide variety of sulfonated polymers are highly conducting to lithium ions and can be used as a polymer matrix or binder material in the cathode-protecting layer or anode-protecting layer. The polymer matrix or binder may be selected from a sulfonated polymer itself, a mixture of a sulfonated polymer and an electron-conducting polymer (intended primarily for use in the cathode side), a mixture of a sulfonated polymer and an electronically non-conducting polymer, or a mixture of an electron-conducting polymer and a lithium ion-conducting polymer.

The sulfonated polymer may be selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidene fluoride, sulfonated copolymers of polyvinylidene fluoride with hexafluoropropene and tetrafluoroethylene, sulfonated copolymers of ethylene and tetrafluoroethylene, polybenzimidazole, and chemical derivatives, copolymers, and blends thereof.

These sulfonated polymers can be easily mixed with various inorganic material particles via any solution mixing or melt mixing method well-known in the art. These inorganic species are commercially available or readily synthesizable in the laboratory.

In certain embodiments, the polymer matrix or binder comprises a mixture of an electron-conducting polymer and a lithium ion-conducting polymer, wherein the lithium ion-conducting polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly (ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

In certain embodiments, the first or second polymer matrix or binder contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, and poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, or a combination thereof.

The first or second inorganic material particles may be selected from a metal oxide, metal carbide, metal nitride, metal boride, metal dichalcogenide, phosphate, sulfate, titanate, silicate, aluminosilicate, or a combination thereof. In certain embodiments, the first or second inorganic material particles are selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, aluminum, or a combination thereof.

The first or second inorganic material particles may be advantageously produced in the form of nanodiscs, nanoplatelets, nanosheets, nanowires, nanotubes, fibers, filaments, wires, etc.

The inorganic material may be preferably selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm.

In certain embodiments, the first or second inorganic material particles are selected from the group consisting of oxides, phosphates, sulfates, titanates, silicates, and aluminosilicates of at least one of the elements zirconium, aluminum, silicon, lithium, calcium, magnesium, potassium, or sodium.

There are several approaches that can be followed to form a cathode-protecting layer or an anode-protecting layer. These approaches include:

(a) Solution mixing: This includes dispersion or dissolution of particles of inorganic species and a lithium ion-conducting polymer in a solvent to form a solution or suspension, followed by casting or coating into a preferably film or sheet form, and solvent removal. Some of these polymers (e.g. most of the sulfonated polymers) are soluble in water.

(b) In situ precipitation from solution state: This includes preparation of a solution of inorganic species in a solvent, dipping or immersing a porous lithium ion-conducting polymer (e.g. fabric of a sulfonated polymer, polyethylene oxide) in this solution, and allowing precipitation of the inorganic species into pores of the lithium ion-conducting polymer.

(c) Melt mixing: This includes mixing and dispersion of particles of inorganic species in the melt of a lithium ion-conducting polymer and then forming of the resulting composite into a desired shape (e.g. melt mixed in a twin-screw extruder and then extruded into a sheet, film, or other desired shapes).

(d) Physical or chemical vapor deposition: For instance, sputtering of inorganic species onto surfaces of a lithium ion-conducting polymer and well-bonded thereto. This polymer is preferably in a thin film form, powder form, or porous structure that has a high specific surface area to accommodate the inorganic species deposited thereon. This would lead to a more uniform dispersion of the inorganic species in the polymer matrix.

(e) Alternatively, one can prepare a sheet of a highly porous non-woven, mat, paper, foam, or membrane of an electronically inorganic material (e.g. silicon carbide fibers, glass fibers, etc.) by using any known process. This porous structure may be advantageously further strengthened by a binder resin or infiltrated with a lithium ion-conducting polymer. The pores may preferably occupy a volume fraction from 20% to 90% of this porous structure. This can serve as a cathode-protecting layer or an anode-protecting layer. Such a protecting layer is essentially a spacer layer that can withstand a high temperature, remaining as essentially a spacer of certain structural integrity to space apart the anode and the cathode even when the porous separator fails.

In addition to the inorganic particles, a filler in the form of multiple particles, fibers, yarns, wires may be dispersed in the lithium ion-conducting polymer matrix or bonded by such a polymer. The filler may be selected from a glass (e.g. glass fibers), metal oxide, metal carbide, metal nitride, metal boride, metal dichalcogenide, or a combination thereof. In an embodiment, the filler is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form.

Preferably, the filler is selected from nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. These 2D nanomaterials are found to be very effective in helping to stop dendrite penetration; however, they are normally not very permeable to lithium ions or sodium ions. Hence, they must be dispersed in a polymer matrix that is permeable to lithium ions.

Preferably, a lithium ion-conducting polymer (e.g. a sulfonated polymer mixture with inorganic material particles dispersed therein, with or without a filler) can be made into a thin film, paper sheet, fiber web, grid, non-woven mat, and other porous structural shape. Such a porous structure may then be implemented as a spacer or electrode-protecting layer (cathode-protecting layer or anode-protecting layer).

The anode-protecting layer or cathode-protecting layer (collectively called an electrode-protecting layer) may be bonded to an electrode (anode or cathode) using a wide variety of approaches. For instance, one may first form the polymer matrix or binder (inorganic material particles dispersed in a lithium ion-conducting polymer) into a layer of thin film, paper, fabric, web, mat, and the like. Then, one can laminate such a layer onto a primary surface of an electrode using any known lamination procedure.

Alternatively, one may dispense and deposit a layer of the desired polymer-inorganic material mixture onto a primary surface of an electrode (anode or cathode) using air pressure-assisted spraying, ultrasonic spraying, casting, coating, and the like, preferably followed by a roll-pressing or other means of consolidating the electrode-protecting layer and the underlying electrode together to further improve the adhesion between an electrode-protecting layer and an electrode. Preferably, there is a strong chemical bond between the electrode and the electrode-protecting layer. Such a chemical bond can include covalent bond, ionic bond, hydrogen bond, or a combination thereof, not just the van der Waal's forces. Preferably, such bond is formed before the electrode-protecting layer and the underlying electrode (e.g. cathode) are combined with a porous separator, a counter-electrode (e.g. anode), and electrolyte to form a lithium battery cell. In other words, an electrode-protecting layer and the electrode to be protected should preferably be bonded together first prior to bringing the porous separator in contact with the electrode-protecting layer. Such a sequence can help ensure the adhesion between the electrode and the protecting layer being stronger than the adhesion between the porous separator and the electrode-protecting layer.

There is essentially no restriction on the type of cathode active materials for use in the presently invented protected lithium cells. The cathode active material in the cathode in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. Preferred cathode active materials include non-lithiated and slightly lithiated compounds having relatively high lithium or sodium storage capacities, such as $TiS_2$, $MoS_2$, $MnO_2$, $CoO_2$, and $V_2O_5$.

A novel family of 2D metal carbides or metal carbonides, now commonly referred to as MXenes, can be used as a cathode active material. MXenes can be produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$.

In an embodiment, the cathode layer contains an air cathode and the battery is a lithium-air battery. In another embodiment, the cathode active material is selected from sulfur or lithium polysulfide and the battery is a lithium-sulfur battery. In yet another embodiment, the cathode active material may be selected from an organic or polymeric material capable of capturing or storing lithium ions (e.g. via reversibly forming a redox pair with lithium ion).

In the cathode electrode of a lithium-ion battery, the cathode active material may be selected from a metal oxide/phosphate/sulfide/halogenide, an inorganic material, an organic or polymeric material, or a combination thereof:
  a) the group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide (e.g. the well-known NCM, NCA, etc.), transition metal fluoride, transition metal chloride, lithium iron phosphate, lithium manganese phosphate, lithium vanadium phosphate, lithium mixed metal phosphates, transition metal sulfides, and combinations thereof.
     a. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5;
     b. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.
  b) an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, $TiS_2$, $TaS_2$, $MoS_2$, $NbSe_3$, non-lithiated $MnO_2$, $CoO_2$, iron oxide, vanadium oxide, or a combination thereof may be used as a cathode active material in a lithium metal cell.

c) The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]$ n), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The electrolytes that can be used in the lithium battery may be selected from any lithium metal salt that is dissolvable in a solvent to produce an electrolyte. Preferably, the metal salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), or a combination thereof.

The electrolytes used may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The ionic liquid may also be used as an electrolyte for the lithium battery. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

The anode of a lithium-ion battery may contain anode active material particles selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

At the anode side, the anode active material of a lithium metal battery may contain a layer of Li metal or alloy (>70% by weight of Li, preferably >80%, and more preferably >90%). Alternatively, the Li metal or alloy may be supported by a nanostructure composed of conductive nanofilaments. For instance, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electrospinning of polyacrylonitrile (PAN) into polymer nanofibers, followed by carbonization of PAN. It may be noted that some of the pores in the structure, as carbonized, are greater than 100 nm and some smaller than 100 nm.

In summary, a possible lithium metal cell may be comprised of an alkali metal layer (e.g. Li foil, etc.), an anode current collector (e.g. Cu foil and/or a nanostructure of interconnected conductive filaments), a porous separator and an electrolyte phase, a cathode-protecting layer and/or an anode-protecting layer, a cathode, and an optional cathode current collector (e.g. Al foil and/or or a nanostructure of interconnected conductive filaments, such as graphene sheets and carbon nanofibers).

The following examples serve to illustrate the preferred embodiments of the present invention and should not be construed as limiting the scope of the invention:

Example 1: Synthesis of Sulfonated Polyaniline (S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by the following Formula 1, with $R_1$, $R_2$, $R_3$, and $R_4$ group being H, $SO_3^-$ or $SO_3H$ ($R_5$=H) with the content of the latter two being varied between 30% and 75% (i.e., the degree of sulfonation varied between 30% and 75%).

(Formula 1)

The lithium ion conductivity of these $SO_3^-$ or $SO_3H$-based S-PANi compositions was in the range of $8.5 \times 10^{-5}$ S/cm to $4.6 \times 10^{-3}$ S/cm and their electron conductivity in the range of 0.1 S/cm to 0.5 S/cm when the degree of sulfonation was from approximately 30% to 75% (with y being approximately 0.4-0.6).

The electrode-protecting layer materials were obtained by dissolving S-PANi in water or acetonitrile to form a polymer-water or polymer-solvent solution and dispersing commercially available particles of $SiO_2$, $Al_2O_3$, $Si_3N_4$, and their mixtures of various proportions in water/solvent to form suspensions. The suspensions were cast into thin films and then dried to produce electrode-protecting films having a thickness from 150 nm to 65 µm.

Figure 2:
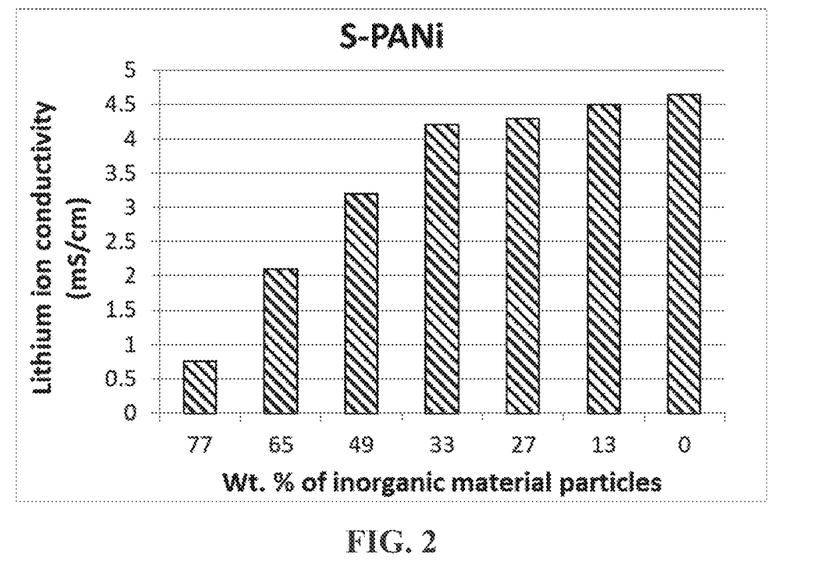
FIG. 2 The lithium ion-conductivity values of the S-PANi/SiO$_2$—Al$_2$O$_3$ (50/50 by volume between SiO$_2$ and Al$_2$O$_3$) composites plotted as a function of the weight % of the inorganic material particles in a sulfonated polyaniline matrix.

In several samples, a suspension was ultrasonic-sprayed on surfaces of a pre-fabricated sulfur cathode electrode to form a protected cathode layer having 5-65% by weight of inorganic particles and 35-95% S-PANi. The lithium ion-conductivity values of these S-PANi/$SiO_2$—$Al_2O_3$ (50/50 by volume between $SiO_2$ and $Al_2O_3$) composites were plotted as a function of the weight % of the inorganic material particles (FIG. 2). This layer (16 µm thick) was found to be also capable of eliminating or reducing the shuttling effect of sulfur and lithium sulfide in a Li—S cell.

In some of these lithium cells, a thin layer of sulfonated PEEK (lithium ion-conducting, but not electron-conducting) 3-120 µm thick, containing particles of $SiO_2$, $Al_2O_3$, and/or $Si_3N_4$, was implemented on the surface of a Li foil at the anode side. As a result, a well-protected Li—S cell was obtained.

Example 2: Sulfonation of Electrically Non-Conducting Polymers

Polytetrafluoroethylene (PTFE), polysulfone (PSf), poly (ether ether ketone) (PEEK), polyimide (PI), and styrene-butadiene copolymers (SB) were separately immersed in a concentrated sulfuric acid (95%+5% water) at 65° C.-90° C. for 4-48 hours to obtain sulfonated polymers. These sulfonated polymers were found to be electrically insulating ($<10^{-8}$ S/cm), but lithium ion-conducting (typically $3 \times 10^{-5}$ S/cm-$4.5 \times 10^{-3}$ S/cm, depending on the degree of sulfonation).

These highly sulfonated polymers were mixed with several types of inorganic material particles (metal oxide, metal carbide, and metal sulfide, as examples of inorganic material particles) to form electrode-protecting layers. When used as a cathode-protecting layer and/or anode-protecting layer, these layers were effective in preventing massive internal shorting when a lithium battery was penetrated by a needle.

Table 1 below demonstrates that the presently invented electrode-protecting layer materials exhibit good lithium ion conductivity values. These conductivity values were measured by the well-known electric impedance method.

TABLE 1

Lithium ion conductivity of various electrode-protecting layer compositions.

| Sample No. | Inorganic materials | Lithium-conducting polymer (sulfonated polymer) | Li-ion conductivity (S/cm) |
|---|---|---|---|
| A1-1 | $ZrO_2$ | S-PANi (23-100% by wt.) | $2.2 \times 10^{-4}$ to $4.1 \times 10^{-3}$ S/cm |
| A1-2 | $Al_2O_3$ | S-PEEK (12-100% by wt.) | $3.3 \times 10^{-4}$ to $2.6 \times 10^{-3}$ S/cm |
| A1-3 | SiC | S-PTFE | $2.2 \times 10^{-4}$ to $1.2 \times 10^{-3}$ S/cm |
| A1-4 | $MoS_2$ | S-PI | $7.4 \times 10^{-4}$ to $4.8 \times 10^{-3}$ S/cm |
| A1-5 | $SiO_2$ | S-PSf | $5.5 \times 10^{-4}$ to $3.3 \times 10^{-3}$ S/cm |
| B1 | $TiO_2$ | S-PSf | $5.7 \times 10^{-4}$ to $2.0 \times 10^{-3}$ S/cm |
| B4 | $Al_2O_3 + Li_2CO_3$ | S-PEEK | $2.6 \times 10^{-4}$ to $3.4 \times 10^{-3}$ S/cm |
| B5 | $SiB_{sul}$ | S-PSf + PEO | $3.7 \times 10^{-4}$ to $3.7 \times 10^{-3}$ S/cm |
| B6 | $SiO_2$ | S-PANi + S-PEEK | $1.2 \times 10^{-3}$ to $3.6 \times 10^{-3}$ S/cm |

Figure 3:
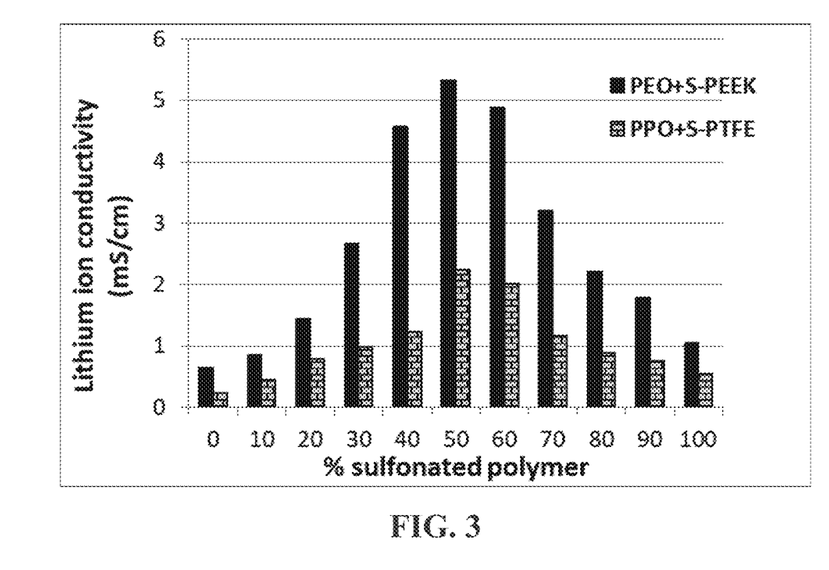
FIG. 3 Lithium ion conductivity values in a solid polymer mixture of a sulfonated polymer (S-PEEK or S-PTFE) and a conventional electrolyte polymer (PEO or PPO) plotted as a function of the sulfonated polymer proportion (each containing 30% by weight of lithium salt).

Example 3: Preparation of Electrode-Protecting Layers Containing Inorganic Particles in a (Non-Sulfonated) Lithium Ion-Conducting Polymer Via Solution or Melt Mixing Another group of presently invented electrode-protecting layers typically comprises (a) a conventional lithium ion-conducting electrolyte polymer (e.g. PEO, PPO, etc.) or its mixtures with a sulfonated polymer and (b) inorganic material particles. As indicated in Table 2 below, these compositions also demonstrate outstanding lithium ion conductivity values. Furthermore, As shown in FIG. 3, the lithium ion conductivity values of a polymer mixture containing a conventional solid electrolyte polymer (PEO or PPO) and a sulfonated polymer exhibit unexpected synergistic effect.

Not to be bound by the theory, but the presence of a different polymer and some lithium-containing inorganic species appear to be capable of forming more amorphous phase in an otherwise crystalline polymer and enabling faster or easier transport of lithium ions through these amorphous zones.

TABLE 2

Lithium ion conductivity of various electrode-protecting compositions.

| Sample No. | Inorganic particles | Lithium-conducting polymer (non-sulfonated polymer) | Li-ion conductivity (S/cm) |
|---|---|---|---|
| D1 | $Li_2CO_3 + SiO_2$ | PEO (15-85% by wt.) | $1.2 \times 10^{-4}$ to $8.1 \times 10^{-4}$ S/cm |
| D2 | $Al_2O_3$ | PEO (5-95% by wt.) | $2.5 \times 10^{-4}$ to $8.5 \times 10^{-4}$ S/cm |
| D3 | $NbO_2$ | PEO | $2.6 \times 10^{-4}$ to $8.2 \times 10^{-4}$ S/cm |
| D4 | $Si_3N_4$ | PAN | $6.4 \times 10^{-5}$ to $5.2 \times 10^{-4}$ S/cm |
| D5 | $Al_2O_3 + Li_2CO_3$ | PPO | $6.6 \times 10^{-5}$ to $4.7 \times 10^{-4}$ S/cm |
| D6 | $SiO_2 + Li_2CO_3$ | PEO + S-PANi | $5.2 \times 10^{-4}$ to $2.7 \times 10^{-3}$ S/cm |
| D7 | $LiOH + TiO_2$ | PEO + S-PEEK (PEO-S-PEEK ratio varied) | See FIG. 3 |
| D8 | $LiOH + Al_2O_3$ | PEO + S-PSf | $3.4 \times 10^{-4}$ to $1.3 \times 10^{-3}$ S/cm |
| D9 | $SiO_2 + Al_2O_3$ | PPO + S-PTFE (PPO-S-PTFE ratio varied) | See FIG. 3 |

Example 4: Preparation of MoS$_2$/RGO Hybrid Cathode Material for Li Metal Cells
(GO=Graphene Oxide; RGO=Reduced Graphene Oxide)

Ultra-thin MoS$_2$/RGO hybrid was synthesized by a one-step solvothermal reaction of (NH$_4$)$_2$MoS$_4$ and hydrazine in an N, N-dimethylformamide (DMF) solution of graphene oxide (GO) at 200° C. In a typical procedure, 22 mg of (NH$_4$)$_2$MoS$_4$ was added to 10 mg of GO dispersed in 10 ml of DMF. The mixture was sonicated at room temperature for approximately 10 min until a clear and homogeneous solution was obtained. After that, 0.1 ml of N$_2$H$_4$—H$_2$O was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into a cathode.

The cathode layer surface was then deposited with a layer of PEO-Al$_2$O$_3$ composition (sprayed, dried, and roll-pressed) prior to being combined with a porous separator and a lithium metal foil (anode) to make a battery cell. The electrolyte used was a quasi-solid electrolyte (3.5 M of LiPF$_6$ in PC-EC solvent mixture). The resulting battery was found to be highly fire resistant when nail-penetrated.

Example 5: Preparation of Graphene-Enabled Li$_x$V$_3$O$_8$ Nanosheets as a Cathode for a Li-Ion Cell All chemicals used in this study were analytical grade and were used as received without further purification. V$_2$O$_5$ (99.6%, Alfa Aesar) and LiOH (99+%, Sigma-Aldrich) were used to prepare the precursor solution. Graphene oxide (GO, 1% w/v obtained from Taiwan Graphene Co., Taipei, Taiwan) was used as a structure modifier. First, V$_2$O$_5$ and LiOH in a stoichiometric V/Li ratio of 1:3 were dissolved in actively stirred de-ionized water at 50° C. until an aqueous solution of Li$_x$V$_3$O$_8$ was formed. Then, GO suspension was added while stirring, and the resulting suspension was atomized and dried in an oven at 160° C. to produce the spherical composite particulates of GO/Li$_x$V$_3$O$_8$ nanosheets and the sample was designated NLVO-1. Corresponding Li$_x$V$_3$O$_8$ materials were obtained under comparable processing conditions, but without graphene oxide sheets. The sample was designated as LVO-2.

The Nyquist plots obtained from electrical impedance tests show a semicircle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of ions in the solid matrix. The values of Rct for the vanadium oxide alone and graphene-enhanced composite electrodes are about 50.0 and 350.0Ω for NLVO-1 and LVO-2, respectively. The Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling.

These cathode materials were respectively formed into cathodes, deposited with a cathode-protecting layer (50% Al$_2$O$_3$ in PPO) and then each combined with a layer of lithiated natural graphite particles (as an anode) to prepare a lithium-ion battery. A corresponding cell containing no cathode-protecting layer was also prepared for comparison purpose. The electrolyte was a conventional PEO gel electrolyte containing LiPF$_6$ in PC-EC solvent. Needle penetration test results indicate that the protected cells did not catch fire, but the conventional cell did.

Example 6: Protected Li—S Batteries

The cathode electrode was prepared following the following procedure. The electrochemical deposition of sulfur (S) was conducted before the cathode active layer was incorporated into a lithium-sulfur battery cell (Li—S). The anode, the electrolyte, and the integral layer of porous graphene structure (serving as a cathode layer) are positioned in an external container outside of a lithium-sulfur cell. The needed apparatus was similar to an electro-plating system, which is well-known in the art.

In a typical procedure, a metal polysulfide (Li$_2$S$_9$ and Nai$_2$S$_6$) was dissolved in a solvent (e.g. mixture of DOL/DME at a volume ratio from 1:3 to 3:1) to form an electrolyte solution. The electrolyte solution was then poured into a chamber or reactor under a dry and controlled atmosphere condition (e.g. He or Nitrogen gas). A metal foil was used as the anode and a layer of the porous graphene foam structure as the cathode; both being immersed in the electrolyte solution. This configuration constitutes an electrochemical deposition system. The step of electrochemically depositing nanoscaled sulfur particles or coating on the graphene surfaces was conducted at a current density preferably in the range of 1 mA/g to 10 A/g, based on the layer weight of the porous graphene structure.

The chemical reactions that occurred in this reactor may be represented by the following equation: $M_xS_y \rightarrow M_xS_{y-z} + zS$ (typically z=1-4). Quite surprisingly, the precipitated S is preferentially nucleated and grown on massive graphene surfaces to form nanoscaled coating or nanoparticles. The coating thickness or particle diameter and the amount of S coating/particles was controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited.

Several Li—S cells were produced wherein lithium metal foil was used as an anode active material and lithium trifluoromethane-sulfonimide (LiTFSI), dissolved in 1,3-dioxolane (DOL), was used as the electrolyte. In a first group of Li—S cells, a cathode-protecting layer based on S-PANi/Al$_2$O$_3$ (prepared in Example 1) was implemented between a porous PE-PP separator and the cathode layer. In a second group of Li—S cells, sulfonated PEEK containing SiC particles as prepared in Example 2 was used as an anode-protecting layer. In a third group of Li—S cells, both an anode-protecting layer and a cathode-protecting layer were implemented. In a fourth group of cells, no electrode-protecting layer was used. The first three groups of cells do not exhibit any fire issue when they were nail-penetrated. In contrast, the fourth group of cells, when nail-penetrated, caught fire and exploded. The first and third groups of Li—S cells exhibit significantly longer cycle-life as compared to the second and fourth groups.

Example 7: Porous Paper Sheets of Alumina Fibers and Ultra-Thin MoS$_2$ Nanosheets Commercially available aluminum oxide fibers and MoS$_2$ nanosheets prepared in Example 4 were respectively formed into paper sheets (thickness from 6 to 25 μm) using a well-known paper-making procedure (the vacuum-assisted filtration method). These porous paper sheets were implemented between the porous separator and the anode or cathode of several different lithium-ion cells as a heat-resistant spacer layer. Upon needle penetration, the cells containing such a paper sheet did not catch fire or explode when a quasi-solid electrolyte (3.5 M of LiPF$_6$ in PC-EC solvent mixture) was used. When a conventional liquid electrolyte (1.0 M of LiPF$_6$ in PC-EC solvent mixture) was used, the cells containing such a spacer layer did not catch fire, but some smoke and internal high temperatures were observed. The cells containing no heat-resistant spacer and containing the conventional liquid electrolyte caught fire and exploded.

The invention claimed is:

1. A lithium secondary battery comprising an anode, a cathode, a porous separator disposed between said anode and said cathode, an electrolyte, and a cathode-protecting layer bonded or adhered to said cathode and disposed between said cathode and said porous separator, wherein said cathode-protecting layer comprises a first lithium ion-conducting polymer matrix or binder and first inorganic material particles that are dispersed in or chemically bonded by said first polymer matrix or binder and wherein said first polymer matrix or binder has a lithium-ion conductivity from $10^{-8}$ S/cm to $5\times10^{-2}$ S/cm and said first inorganic material particles have a heat-induced degradation temperature or melting point higher than 400° C., wherein said first inorganic material particles are selected from the group consisting of an oxide of at least one of the elements silicon, potassium, and sodium, metal carbide, metal boride, metal dichalcogenide, sulfate, silicate, aluminosilicate, and combinations thereof; an oxide of molybdenum, vanadium, chromium, manganese, and combinations thereof, a dichalcogenide, trichalcogenide, sulfide, selenide, or telluride of niobium, zirconium, molybdenum, hafnium, tantalum, tungsten, titanium, vanadium, chromium, cobalt, manganese, iron, nickel, aluminum, and combinations thereof; nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; phosphates of at least one of the elements zirconium, silicon, calcium, magnesium, potassium, and sodium, titanates of at least one of the elements aluminum, silicon, calcium, magnesium, potassium, and sodium, sulfates, silicates, and aluminosilicates of at least one of the elements zirconium, aluminum, silicon, lithium, calcium, magnesium, potassium, and sodium.

2. The lithium secondary battery of claim 1, further comprising an anode-protecting layer adhered or bonded to said anode and disposed between said anode and said porous separator, wherein said anode-protecting layer comprises a second lithium ion-conducting polymer matrix or binder and second inorganic material particles that are dispersed in or chemically bonded by said second polymer matrix or binder and wherein second polymer matrix or binder has a lithium-ion conductivity from $10^{-8}$ S/cm to $5\times10^{-2}$ S/cm and said second inorganic material particles have a heat-induced degradation temperature or melting point higher than 400° C. and wherein said second lithium ion-conducting polymer matrix or binder is the same or different than the first lithium ion-conducting polymer matrix or binder and said second inorganic material is the same or different than said first inorganic material.

3. A lithium secondary battery comprising an anode, a cathode, a porous separator disposed between said anode and said cathode, an electrolyte, and an anode-protecting layer adhered or bonded to said anode and disposed between said anode and said porous separator, wherein said anode-protecting layer comprises a second lithium ion-conducting polymer matrix or binder and second inorganic material particles that are dispersed in or chemically bonded by said second polymer matrix or binder and wherein said second inorganic material particles have a heat-induced degradation temperature or melting point higher than 400° C. and said second polymer matrix or binder has a lithium-ion conductivity from $10^{-8}$ S/cm to $5\times10^{-2}$ S/cm, and wherein said second inorganic material particles are selected from the group consisting of an oxide of at least one of the elements silicon, potassium, and sodium, metal carbide, metal boride, metal dichalcogenide, sulfate, silicate, aluminosilicate, and combinations thereof; an oxide of molybdenum, vanadium, chromium, manganese, and combinations thereof, a dichalcogenide, trichalcogenide, sulfide, selenide, or telluride of niobium, zirconium, molybdenum, hafnium, tantalum, tungsten, titanium, vanadium, chromium, cobalt, manganese, iron, nickel, aluminum, and combinations thereof; nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; phosphates of at least one of the elements zirconium, silicon, calcium, magnesium, potassium, and sodium, titanates of at least one of the elements aluminum, silicon, calcium, magnesium, potassium, and sodium, sulfates, silicates, and aluminosilicates of at least one of the elements zirconium, aluminum, silicon, lithium, calcium, magnesium, potassium, and sodium.

4. A lithium secondary battery comprising an anode, a cathode, a porous separator disposed between said anode and said cathode, an electrolyte, and a heat-resistant spacer layer disposed between said porous separator and said anode or cathode, wherein said heat-resistant spacer layer contains a distribution of particles of a thermally stable material having a heat-induced degradation temperature or melting point higher than 400° C. and wherein said heat-resistant spacer layer acts to space apart said anode and said cathode when said porous separator fails, wherein said thermally stable material are selected from the group consisting of an oxide of at least one of the elements silicon, potassium, and sodium, metal carbide, metal boride, metal dichalcogenide, sulfate, silicate, aluminosilicate, and combinations thereof; molybdenum, vanadium, chromium, manganese, and combinations thereof, a dichalcogenide, trichalcogenide, sulfide, selenide, or telluride of niobium, zirconium, molybdenum, hafnium, tantalum, tungsten, titanium, vanadium, chromium, cobalt, manganese, iron, nickel, aluminum, and combinations thereof; nanodiscs, nanoplatelets, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal;

(d) boron nitride, or (e) a combination thereof; phosphates of at least one of the elements zirconium, silicon, calcium, magnesium, potassium, and sodium, titanates of at least one of the elements aluminum, silicon, calcium, magnesium, potassium, and sodium, sulfates, silicates, and aluminosilicates of at least one of the elements zirconium, aluminum, silicon, lithium, calcium, magnesium, potassium, and sodium.

5. The lithium secondary battery of claim 4, wherein said thermally stable material particles are in a form of fibers, nanofibers, nanotubes, nanosheets, nanoplatelets, nanoribbons, or a combination thereof that are formed into a woven fabric, non-woven structure, porous paper, or porous membrane sheet.

6. The lithium secondary battery of claim 1, wherein said first polymer matrix or binder comprises a sulfonated polymer, a mixture of a sulfonated polymer and an electron-conducting polymer, a mixture of a sulfonated polymer and an electronically non-conducting polymer, or a mixture of an electron-conducting polymer and a lithium ion-conducting polymer.

7. The lithium secondary battery of claim 1, wherein said electrolyte is selected the group consisting of from a non-aqueous liquid electrolyte, polymer gel electrolyte, polymer electrolyte, quasi-solid electrolyte, solid-state inorganic electrolyte, ionic liquid electrolyte, and combinations thereof.

8. The lithium secondary battery of claim 7, wherein said electrolyte is a non-flammable electrolyte comprising a lithium salt dissolved in a liquid solvent having a lithium salt concentration from 3.5 M to 14.0 M so that the electrolyte exhibits a vapor pressure less than 0.01 kPa when measured at 20° C., a vapor pressure less than 60% of the vapor pressure of the liquid solvent alone, a flash point at least 20 degrees Celsius higher than a flash point of the liquid solvent alone, a flash point higher than 150° C., or no flash point.

9. The lithium secondary battery of claim 7, wherein said electrolyte is a non-flammable electrolyte comprising a lithium salt dissolved in a mixture of a liquid solvent and a liquid additive having a lithium salt concentration from 1.75 M to 5.0 M so that said electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of said liquid solvent alone, a flash point higher than 150° C., or no flash point, wherein said liquid additive, different in composition than said liquid solvent, is selected from hydrofluoro ether (HFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), alkylsiloxane (Si—O), alkyylsilane (Si—C), liquid oligomeric silaxane (—Si—O—Si—), tetraethylene glycol dimethylether (TEGDME), canola oil, or a combination thereof and said liquid additive-to-said liquid solvent ratio in said mixture is from 5/95 to 95/5 by weight.

10. The lithium secondary battery of claim 1, wherein said electrolyte comprises a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, and combinations thereof.

11. The lithium secondary battery of claim 1, wherein said electrolyte comprises a lithium salt selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium, $LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bis-perfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

12. The lithium secondary battery of claim 6, wherein said sulfonated polymer is selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly (ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

13. The lithium secondary battery of claim 1, wherein said first polymer matrix or binder comprises a lithium ion-conducting polymer selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly (ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

14. The lithium secondary battery of claim 1, wherein said first polymer matrix or binder contains a lithium ion-conducting polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, and poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, and combinations thereof.

15. The lithium secondary battery of claim 1, wherein said first polymer matrix or binder has a room temperature lithium ion conductivity no less than $10^{-4}$ S/cm.

16. The lithium secondary battery of claim 1, wherein said first polymer matrix or binder has a room temperature lithium ion conductivity no less than $10^{-3}$ S/cm.

17. The lithium secondary battery of claim 1, wherein said cathode-protecting layer is bonded or adhered to said cathode with a first adhesion strength and said cathode-protecting layer is adhered to said separator having a second adhesion strength which is smaller than said first adhesion strength.

18. The lithium secondary battery of claim 3, wherein said anode-protecting layer is bonded or adhered to said anode with a first adhesion strength and said anode-protecting layer is adhered to said separator having a second adhesion strength which is smaller than said first adhesion strength.

19. The lithium secondary battery of claim 1, which is a lithium-ion battery, a rechargeable lithium metal battery, a lithium-sulfur battery, a lithium-selenium battery, or a lithium-air battery.

20. The lithium secondary battery of claim 1, wherein said porous separator contains a film, woven fabric, or non-woven fabric formed using one or more selected from the group consisting of high-density polyethylene, low-density polyethylene, linear low-density polyethylene, ultrahigh-molecular weight polyethylene, polypropylene, polyethylene terephthalate, polybutylene terephthalate, polyester, polyacetal, polyamide, polycarbonate, polyimide, poly ether ether ketone, polyether sulfone, polyphenylene oxide, polyphenylene sulfide, polyethylene naphthalene, co-polymers thereof, blends thereof, and combinations thereof.

\* \* \* \* \*